(12) United States Patent
Deferme

(10) Patent No.: US 7,703,586 B2
(45) Date of Patent: Apr. 27, 2010

(54) FOUR-PIECE PISTON

(75) Inventor: Stefan Deferme, Heusdem-Zolber (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 980 days.

(21) Appl. No.: 11/472,261

(22) Filed: Jun. 21, 2006

(65) Prior Publication Data

US 2006/0283676 A1 Dec. 21, 2006

Related U.S. Application Data

(60) Provisional application No. 60/692,434, filed on Jun. 21, 2005.

(51) Int. Cl.
F16F 9/34 (2006.01)

(52) U.S. Cl. .............. 188/322.13; 188/322.15; 188/282.5

(58) Field of Classification Search .......... 188/322.13, 188/322.15, 322.22, 282.5, 282.6, 280, 313, 188/316, 317, 320; 137/493, 493.8, 493.9, 137/513.3, 852–857
See application file for complete search history.

(56) References Cited

U.S. PATENT DOCUMENTS

| | | | |
|---|---|---|---|
| 3,837,445 A | 9/1974 | Pierle | |
| 5,148,897 A | 9/1992 | Vanroye | |
| 5,518,090 A | 5/1996 | Miller et al. | |
| 6,464,053 B1 | 10/2002 | Hoebrechts | |
| 7,070,029 B2 * | 7/2006 | Deferme | 188/322.15 |

FOREIGN PATENT DOCUMENTS

| | | |
|---|---|---|
| JP | 07-233841 | 9/1995 |
| JP | 07-238976 | 9/1995 |
| JP | 10-103512 | 4/1998 |
| KR | 2006102691 A * | 9/2006 |

OTHER PUBLICATIONS

Examination Report from corresponding GB application No. GB0612335.0 dated Apr. 17, 2009.
Search Report from corresponding UK Patent Application No. 0612335.0 dated Oct. 11, 2006.

\* cited by examiner

*Primary Examiner*—Pam Rodriguez
(74) *Attorney, Agent, or Firm*—Harness, Dickey & Pierce, PLC

(57) ABSTRACT

A shock absorber piston has an upper half, a lower half and a tuning disc disposed between the upper and lower halves. The design for the openings in the tuning disc can be selected to individually tune the high and low speed damping characteristics in both compression and extension movements of the shock absorber.

17 Claims, 5 Drawing Sheets

FOUR-PIECE PISTON

CROSS-REFERENCE TO RELATED APPLICATIONS

This application claims the benefit of U.S. Provisional Application No. 60/692,434, filed on Jun. 21, 2005. The disclosure of the above application is incorporated herein by reference.

FIELD

The present application/patent relates generally to hydraulic dampers or shock absorbers for use in a suspension system such as a suspension system used for automotive vehicles. More particularly, the present application/patent relates to a multi-piece piston where the components of the piston can be individually selected to tune the bleed restriction and/or the high speed restriction.

BACKGROUND

The statements in this section merely provide background information related to the present disclosure and may not constitute prior art.

Shock absorbers are used in conjunction with automotive suspension systems to absorb unwanted vibrations which occur during driving. Shock absorbers are generally connected between the sprung portion (body) and the unsprung portion (wheels) of the automobile. A piston is located within a working chamber defined by a pressure tube of the shock absorber, with the piston being connected to the sprung portion of the automobile through a piston rod. The pressure tube is connected to the unsprung portion of the vehicle by one of the methods known in the art. Because the piston is able, through valving, to limit the flow of damping fluid between opposite sides of the piston when the shock absorber is compressed or extended, the shock absorber is able to produce a damping force which damps the unwanted vibration which would otherwise be transmitted between the unsprung portion and the sprung portion of the automobile.

Shock absorbers have been developed to provide different damping characteristics depending upon the speed or acceleration of the piston within the pressure tube. Because of the exponential relation between the pressure drop and flow rate, it is difficult to obtain a damping force at relatively low piston velocities, particularly at velocities near zero. Low speed damping force is important to vehicle handling since most vehicle handling events are controlled by low speed vehicle body velocities. It is also important to control damping force over the broad range of pressures generated across the piston as the piston velocity increases.

Various prior art systems for tuning shock absorbers during low speed movement of the piston have integrated a bleed flow of the hydraulic fluid. In piston valving with this integrated bleed flow, various alternatives for incorporating the bleed flow are possible. A fixed low speed bleed orifice can be created by utilizing orifice notches positioned either on the flexible disc adjacent the sealing land or by utilizing orifice notches directly in the sealing land itself. Another alternative is to incorporate straight bleed holes that end in a horse-shoe or circular shaped valve area which is then closed using a low speed valve disc. The designs with cross-drilled holes have been found to have a slightly better performance on hydraulic flow noise but a cross-drilled set of holes does not lend itself to the economics of mass production. In addition, using cross-drilled holes requires that a different piston will have to be designed for different applications since the number and diameter of the bleed holes are a tuning parameter. This fact also increases the complexities associated with mass production of shock absorbers.

SUMMARY

A shock absorber piston has an upper half and a lower half component. Positioned between the upper and lower half components is a disc. The disc is shaped to provide a restriction for the various flow passages extending through the upper and lower half components. The shape of the disc controls the tuning for the bleed flow and/or the high speed flow. This allows for common upper and lower half components for multiple applications with the disc being the only component which is unique to specific applications.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
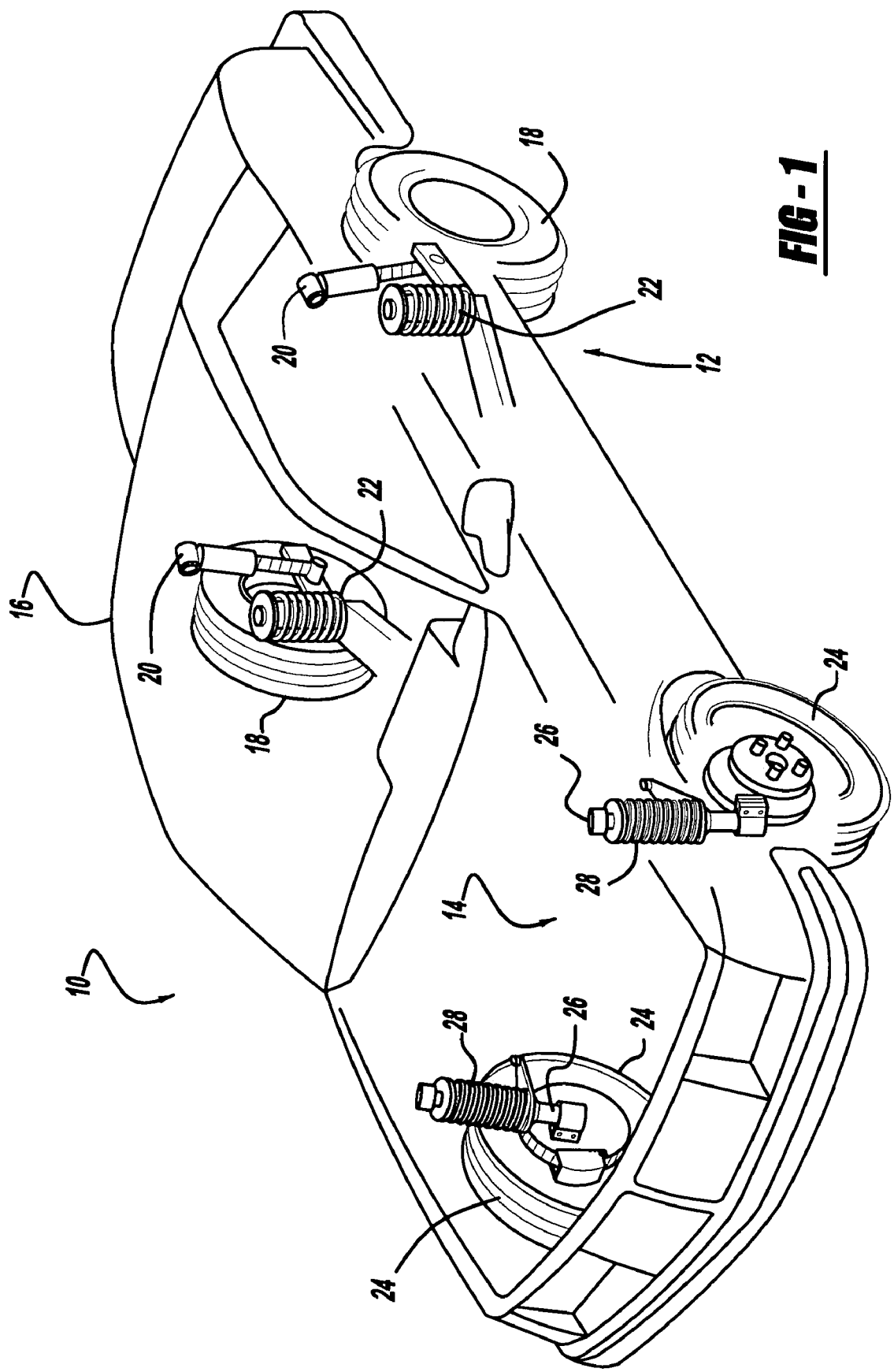
FIG. 1 is an illustration of an automobile having shock absorbers which incorporate the piston design in accordance with the present invention.

The following description is merely exemplary in nature and is not intended to limit the present disclosure, application, or uses. There is shown in FIG. 1 a vehicle incorporating a suspension system having shock absorbers, each of which incorporates a piston assembly in accordance with the present invention, and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
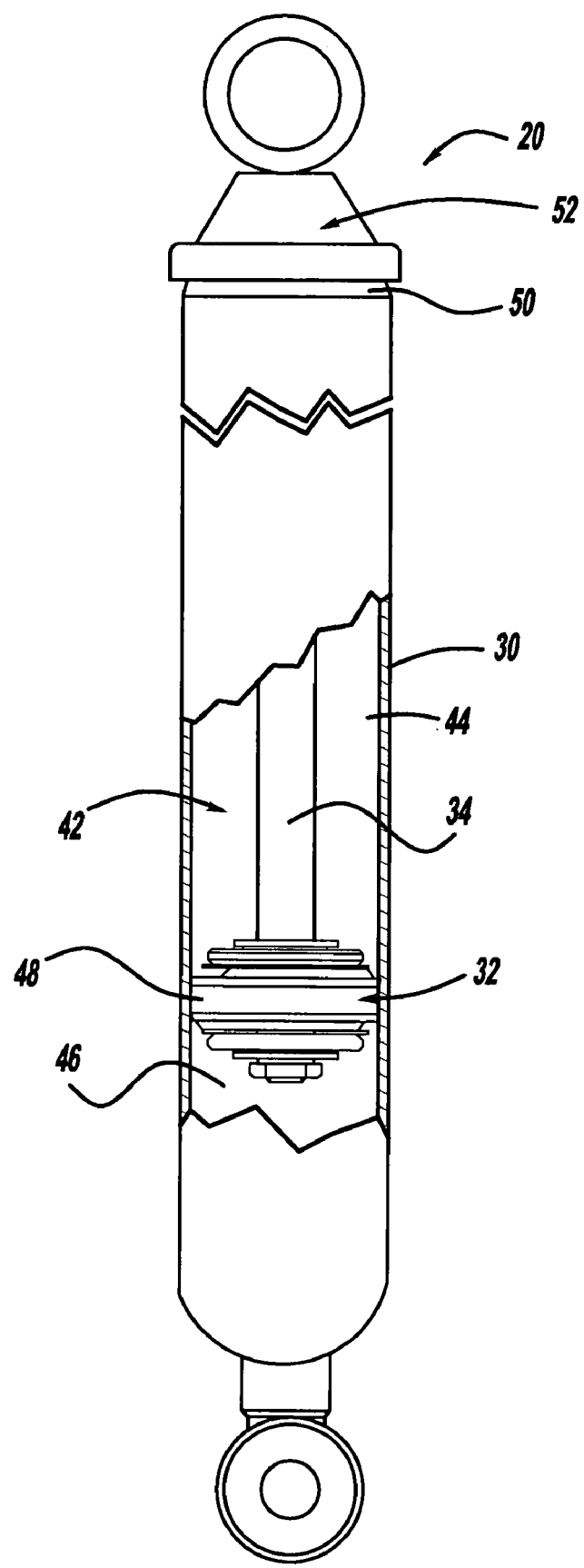
FIG. 2 is a side view, partially in cross-section of a shock absorber from FIG. 1 which incorporates the piston design in accordance with the present invention.
Figure 3:
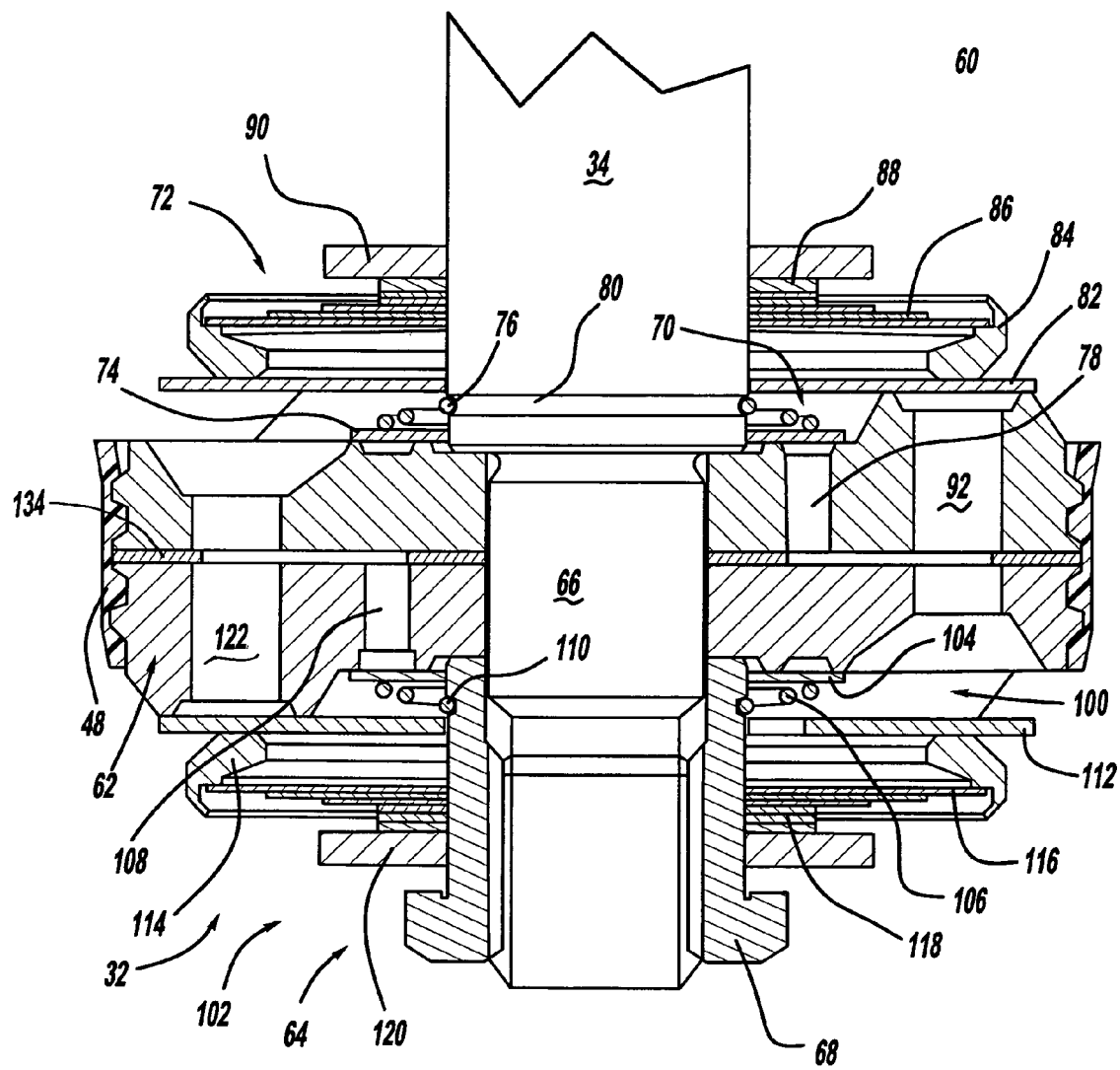
FIG. 3 is an enlarged side view, partially in cross-section, of the piston assembly from the shock absorber illustrated in FIG. 2.
Figure 4:
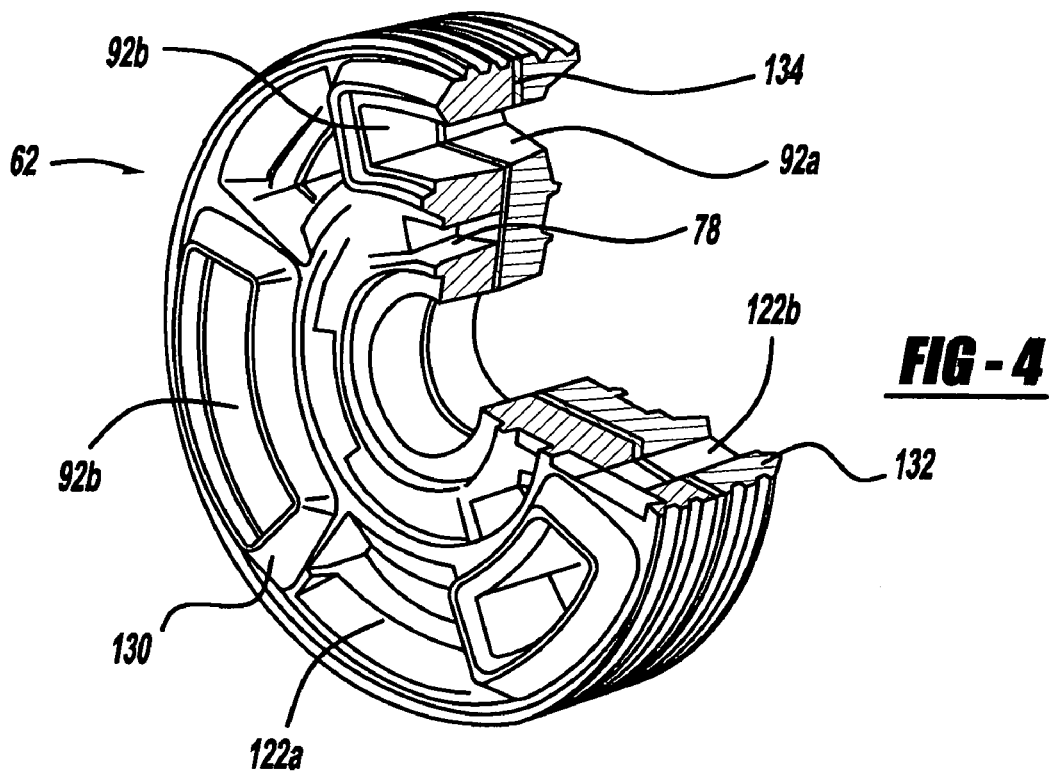
FIG. 4 is a cut-away perspective view of the piston illustrated in FIG. 3.
Figure 5:
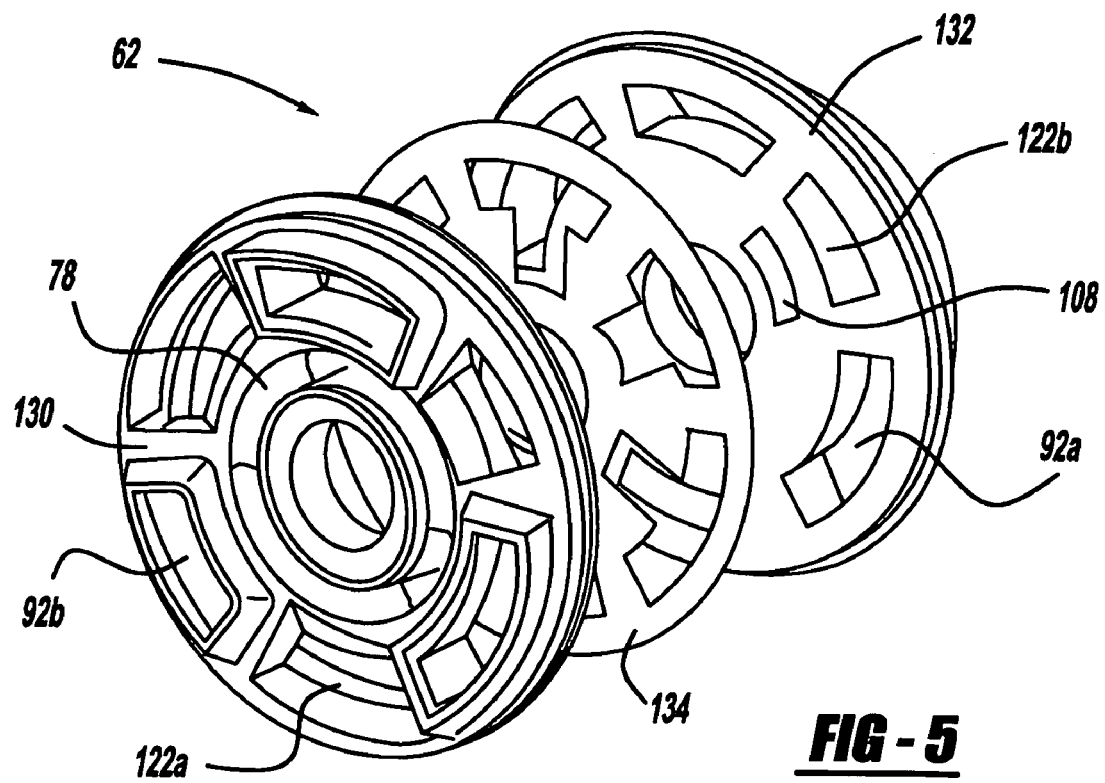
FIG. 5 is an exploded perspective view of the piston illustrated in FIG. 3; and, FIG. 6 is a plan view of the tuning disc illustrated in FIGS. 3-5.

Referring now to FIG. 2, shock absorber 20 is illustrated in greater detail. While FIG. 2 illustrates only shock absorber 20, it is to be understood that shock absorber 26 also includes the multi-piece piston in accordance with the present invention. Shock absorber 26 only differs from shock absorber 20 in the way it is adapted to be connected to the sprung and unsprung portions of vehicle 10. Shock absorber 20 comprises a pressure tube 30, a piston assembly 32 and a piston rod 34. While shock absorber 20 with piston assembly 32 is illustrated as a mono-tube shock absorber, piston assembly 32 can also be utilized in a dual-tube or multi-tube shock absorber.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap or rod guide 50 which closes the upper end of pressure tube 30. A sealing system 52 seals the interface between rod guide 50, pressure tube 30 and piston rod 34. The end of piston rod 34 opposite to piston assembly 32 is adapted to be secure to the sprung portion of vehicle 10. The end of pressure tube 30 opposite to rod guide 50 is adapted to be connected to the unsprung portion of vehicle 10. Extension valving of piston assembly 32 controls the movement of fluid between upper working chamber 44 and lower working chamber 46 during an extension movement of piston assembly 32 within pressure tube 30. Compression valving of piston assembly 32 controls the movement of fluid between lower working chamber 46 and upper working chamber 44 during a compression movement of piston assembly 32 within pressure tube 30.

Referring to FIGS. 2-6, piston assembly 32 is illustrated in greater detail. Piston assembly 32 comprises a compression valve assembly 60, a multi-piece piston body 62 and an extension valve assembly 64. Piston rod 34 defines a reduced diameter section 66 onto which multi-piece piston body 62 and extension valve assembly 64 are located. A nut 68 secures piston assembly 32 onto section 66 of piston rod 34 with compression valve assembly 60 extending onto piston rod 34, multi-piece piston body 62 abutting a shoulder located on piston rod 34 and abutting compression valve assembly 60, extension valve assembly 64 abutting multi-piece piston body 62 and nut 68 abutting extension valve assembly 64 and multi-piece piston body 62.

Compression valve assembly 60 comprises a bleed flow check valve 70 and a damping valve 72. Bleed flow check valve 70 comprises a bleed disc 74 and a bleed spring 76. Bleed disc 74 covers a plurality of compression bleed passages 78 extending into multi-piece piston body 62. Bleed spring 76 extends between bleed disc 74 and a groove 80 formed into piston rod 34. Bleed spring 76 urges bleed disc 74 against multi-piece piston body 62 to prevent fluid flow from upper working chamber 44 to lower working chamber 46 but fluid flow from lower working chamber 46 to upper working chamber 44 is allowed due to the compression of bleed spring 76 as detailed below.

Damping valve 72 comprises a damping disc 82, an annular housing 84, one or more biasing members 86, one or more spacers 88 and a retainer 90. Damping disc 82 covers a plurality of compression passages 92 extending into multi-piece piston body 62. Annular housing 84 abuts the side of damping disc 82 opposite to multi-piece piston body 62. The one or more biasing members 86 engage annular housing 84 and urge annular housing 84 into engagement with damping disc 82 which urges damping disc 82 against multi-piece piston body 62. The one or more spacers 88 are located between the one or more biasing members 86 and retainer 90. Retainer 90 is fixedly secured to piston rod 34 by welding, by using a snap ring, or by any other means known in the art. The position of retainer 90 determines the biasing load applied by the one or more biasing members 86 and thus the damping characteristics for shock absorber 20 during a compression stroke. Damping disc 82 prevents fluid flow from upper working chamber 44 to lower working chamber 46 but fluid flow from lower working chamber 46 to upper working chamber 44 is allowed due to the unseating of damping disc 82 due to the deflection of the one or more biasing members 86.

Extension valve assembly 64 comprises a bleed flow check valve 100 and a damping valve 102. Bleed flow check valve 100 comprises a bleed disc 104 and a bleed spring 106. Bleed disc 104 covers a plurality of extension bleed passages 108 extending into multi-piece piston body 62. Bleed spring 106 extends between bleed disc 104 and a groove 110 formed into nut 68. Bleed spring 106 urges bleed disc 104 against multi-piece piston body 62 to prevent fluid flow from lower working chamber 46 to upper working chamber 44 but fluid flow from upper working chamber 44 to lower working chamber 46 is allowed due to the compression of bleed spring 106 as detailed below.

Damping valve 102 comprises a damping disc 112, an annular housing 114, one or more biasing members 116, one or more spacers 118 and a retainer 120. Damping disc 112 covers a plurality of extension passages 122 extending into multi-piece piston body 62. Annular housing 114 abuts the side of damping disc 112 opposite to multi-piece piston body 62. The one or more biasing members 116 engage annular housing 114 and urge annular housing 114 into engagement with damping disc 112 which urges damping disc 112 against multi-piece piston body 62. The one or more spacers 118 are located between the one or more biasing members 116 and retainer 120. Retainer 120 is fixedly secured to nut 68 by welding, by using a snap ring, or by any other means known in the art. The position of retainer 120 determines the biasing load applied by the one or more biasing members 116 and thus the damping characteristics for shock absorber 20 during an extension stroke. Damping disc 112 prevents fluid flow from lower working chamber 46 to upper working chamber 44 but fluid flow from upper working chamber 44 to lower working chamber 46 is allowed due to the unseating of damping disc 112 due to the deflection of the one or more biasing members 116.

Multi-piece piston body 62 comprises a rebound side housing 130, a compression side housing 132 and a tuning disc 134. Rebound side housing 130 defines a plurality of extension passage inlets 122a, a plurality of compression passage outlets 92b and the plurality of compression bleed passages 78. Compression side housing 132 defines a plurality of compression passage inlets 92a, a plurality of extension passage outlets 122b and the plurality of extension bleed passages 108. Tuning disc 134 is disposed between rebound side housing 130 and compression side housing 132 and the shape of tuning disc 134 also determines the damping characteristics for shock absorber 20.

Figure 6:
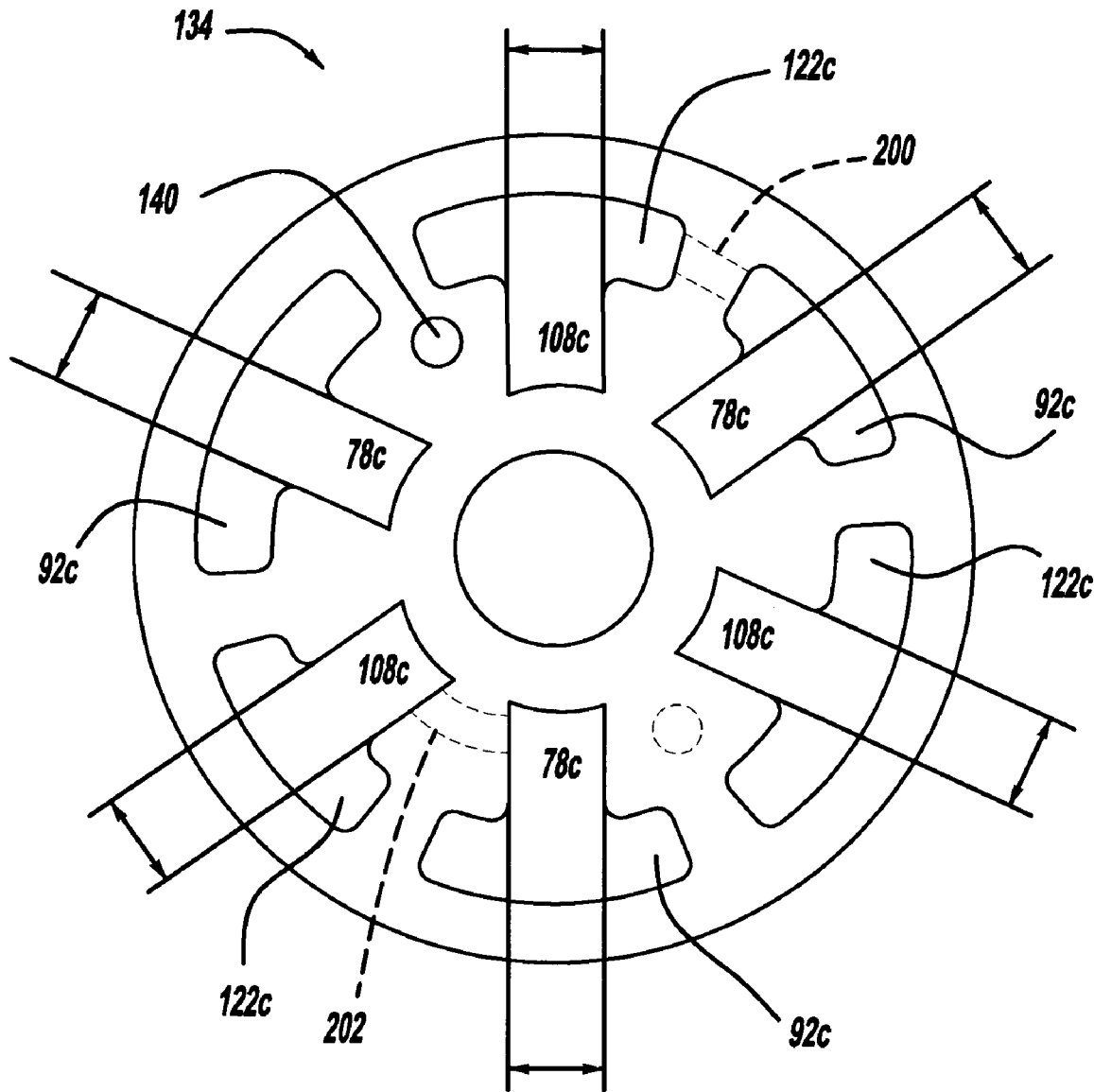

Referring now to FIG. 6, tuning disc 134 defines a plurality of compression bleed passage openings 78c, a plurality of extension bleed passage openings 108c, a plurality of compression openings 92c and a plurality of extension openings 122c. When properly assembled, the compression bleed passage openings 78c align with the plurality of compression bleed passages 78, the plurality of extension bleed passage openings 108c align with the plurality of extension bleed passages 108, the plurality of compression openings 92c align with the plurality of compression passages 92 and the plurality of extension openings 122c align with the plurality of extension passages 122. In order to maintain the alignment of the above openings with their respective passages, various orientation means should be incorporated. A specific assembly tool (not shown) can be used to orient the parts directly followed by a banding process such as the assembly of seal 48. Seal 48 will act as retaining means and keep the components together in an assembled condition in the correct orientation during handling and assembly of piston assembly 32. One or more dents 140 can be formed into tuning disc 134. Dents 140 can be designed to engage one or more holes (now shown) in rebound side housing 130 and one or more holes (not shown) in compression side housing 132 to provide the correct orientation. A slight interference fit can be used between the dents 140 and their respective hole to make it possible to further handle piston assembly 32. In addition, or as a replacement for the interference fit, seal 48 can be utilized to maintain the orientation of the components.

During a compression stroke of shock absorber 20, fluid pressure in lower working chamber 46 increases and fluid pressure in upper working chamber 44 decreases. This difference in fluid pressure reacts against bleed disc 74 and damping disc 82 in a direction that attempts to unseat bleed disc 74 and damping disc 82 from multi-piece piston body 62. This difference in fluid pressure also reacts against bleed disc 104 and damping disc 112 to urge bleed disc 104 and damping disc 112 into engagement with multi-piece piston body 62. At a relatively low fluid pressure differential, bleed disc 74 will unseat from multi-piece piston body 62 due to the compression of bleed spring 76. Bleed spring 76 is designed to only exert a light pressure on bleed disc 74 and will thus readily allow a bleed flow of fluid past bleed disc 74. Fluid will flow from lower working chamber 46 through the plurality of compression passage inlets 92a through the plurality of compression bleed passage openings 78c, through the plurality of compression bleed passages 78, past bleed disc 74 and into upper working chamber 44. When the fluid pressure differential increases, eventually damping disc 82 will unseat from multi-piece piston body 62 due to the deflection of the one or more biasing members 86 and fluid will also flow from lower working chamber 46, through the plurality of compression inlets 92a, through the plurality of compression openings 92c, through the plurality of compression passage outlets 92b, past damping disc 82 and into upper working chamber 44.

The damping characteristics for shock absorber 20 during a compression stroke are determined by bleed spring 76, the one or more biasing members 86, the thickness of tuning disc 134, the size of compression bleed passage openings 78c and the size of compression openings 92c. Bleed spring 76, the thickness of tuning disc 134 and the size of compression bleed passage openings 78c will determine the low speed or bleed flow damping characteristics for shock absorber 20 during a compression stroke. The one or more biasing members 86 and the size of compression openings 92c will determine the high speed or high flow damping characteristics for shock absorber 20 during a compression stroke.

During an extension or rebound stroke of shock absorber 20, fluid pressure in upper working chamber 44 increases and fluid pressure in lower working chamber 46 decreases. This difference in fluid pressure reacts against bleed disc 104 and damping disc 112 in a direction that attempts to unseat bleed disc 104 and damping disc 112 from multi-piece piston body 62. This difference in fluid pressure also reacts against bleed disc 74 and damping disc 82 to urge bleed disc 74 and damping disc 82 into engagement with multi-piece piston body 62. At a relatively low fluid pressure differential, bleed disc 104 will unseat from multi-piece piston body 62 due to the compression of bleed spring 106. Bleed spring 106 is designed to only exert a light pressure on bleed disc 104 and will thus readily allow a bleed flow of fluid past bleed disc 104. Fluid will flow from upper working chamber 44 through the plurality of extension passage inlets 122a through the plurality of extension bleed passage openings 108c, through the plurality of extension bleed passages 108, past bleed disc 104 and into lower working chamber 46. When the fluid pressure differential increases, eventually damping disc 112 will unseat from multi-piece piston body 62 due to the deflection of the one or more biasing members 116 and fluid will also flow from upper working chamber 44, through the plurality of extension passage inlets 122a, through the plurality of extension openings 122c, through the plurality of extension passage outlets 122b, past damping disc 112 and into lower working chamber 46.

The damping characteristics for shock absorber 20 during a rebound or extension stroke are determined by bleed spring 106, the one or more biasing members 116, the thickness of tuning disc 134, the size of extension bleed passage openings 108c and the size of extension openings 122c. Bleed spring 106, the thickness of tuning disc 134 and the size of extension bleed passage openings 108c will determine the low speed or bleed flow damping characteristics for shock absorber 20 during a rebound stroke. The one or more biasing members 116 and the size of extension openings 122c will determine the high speed or high flow damping characteristics for shock absorber 20 during a rebound stroke.

When tuning shock absorber 20, it may be advantageous to provide a common bleed flow passage 200 which is a passage that is always open in both compression and extension strokes of shock absorber 20. FIG. 6 illustrates, in phantom, bleed flow passage 200 which allows fluid flow between upper and lower working chambers 44 and 46 during both compression and rebound strokes of shock absorber 20.

Another option would be to incorporate a junction bleed flow passage 202 as illustrated in phantom in FIG. 6. Without junction bleed flow passage 202, a normal closed bleed design with two check valves is created as discussed above.

With the incorporation of junction bleed flow passage 202, the design for the bleed flow is provided with a supplementary feature. On very low extension or rebound speeds, the flow through extension bleed passages 108 results in a low pressure drop. The pressure in the working chamber of the bleed is lower than the required pressure to unseat bleed disc 104. The flow path in the extension or rebound stroke will thus be into extension bleed passage 108c, through junction bleed flow passage 202, through compression bleed flow passage 78c, through compression opening 92c, and through compression inlets 92a to provide bleed flow. The amount of bleed flow can be controlled by the size of extension bleed passage 108c, junction bleed flow passage 202 and compression bleed flow passage 78c. When the extension or rebound speed increases, the required pressure to unseat bleed disc 104 will be reached and bleed flow will continue as described above.

Thus, multi-piece piston body 62 permits the individual tuning of compression bleed flow, compression damping, rebound bleed flow and rebound damping by varying the design of tuning disc 134. This permits different applications to utilize the same rebound side housing 130 and compression side housing 132 with the specific tuning requirements being selected by the design of tuning disc 134. In addition, additional tuning requirements can be selected by using different biasing members 86 and/or 112 but still with using common side housings 130 and 132.

What is claimed is:

1. A damper comprising:
    a pressure tube forming a working chamber;
    a piston assembly disposed within said pressure tube, said piston assembly dividing said working chamber into an upper working chamber and a lower working chamber, said piston assembly comprising:
    a first housing;
    a second housing;
    a tuning disc disposed between said first and second housings;
    a first plurality of passages extending between said upper and lower working chambers, said first plurality of passages extending through said first housing, said second housing and said tuning disc; wherein
    said tuning disc defines a minimum cross-sectional area of each of said first plurality of passages.

2. The damper according to claim 1, further comprising:
    a first valve assembly disposed adjacent said first housing, said first valve assembly closing at least one of said first plurality of passages.

3. The damper according to claim 2, wherein said first valve assembly comprises:
    a first valve plate adjacent said first housing; and
    a first biasing member urging said first valve plate towards said first housing.

4. The damper according to claim 3, wherein said first valve assembly comprises:
    a second valve plate adjacent said first housing; and
    a second biasing member urging said second valve plate towards said first housing.

5. The damper according to claim 2, further comprising:
    a second plurality of passages extending between said upper and lower working chambers, said second plurality of passages extending through said first housing, said second housing and said tuning disc; and
    a second valve assembly disposed adjacent said second housing, said second valve assembly closing at least one of said second plurality of passages.

6. The damper according to claim 5, wherein said second valve assembly comprises:
    a first valve plate adjacent said second housing; and
    a first biasing member urging said first valve plate towards said second housing.

7. The damper according to claim 6, wherein said second valve assembly comprises:
    a second valve plate adjacent said second housing; and
    a second biasing member urging said second valve plate towards said second housing.

8. The damper according to claim 5, wherein said tuning disc defines an always open flow path between one of said first plurality of passages and one of said second plurality of passages.

9. The damper according to claim 1, further comprising means for orientating said tuning disc with respect to said first and second housings.

10. The damper according to claim 9, further comprising:
    a first valve assembly disposed adjacent said first housing, said first valve assembly closing at least one of said first plurality of passages.

11. The damper according to claim 10, further comprising:
    a second plurality of passages extending between said upper and lower working chambers, said second plurality of passages extending through said first housing, said second housing and said tuning disc; and
    a second valve assembly disposed adjacent said second housing, said second valve assembly closing at least one of said second plurality of passages.

12. The damper according to claim 11, wherein said tuning disc defines an always open flow path between one of said first plurality of passages and one of said second plurality of passages.

13. The damper according to claim 1, further comprising means for retaining said piston assembly in an assembled condition.

14. The damper according to claim 13, further comprising:
    a first valve assembly disposed adjacent said first housing, said first valve assembly closing at least one of said first plurality of passages.

15. The damper according to claim 14, further comprising:
    a second plurality of passages extending between said upper and lower working chambers, said second plurality of passages extending through said first housing, said second housing and said tuning disc; and
    a second valve assembly disposed adjacent said second housing, said second valve assembly closing at least one of said second plurality of passages.

16. The damper according to claim 15, wherein said tuning disc defines an always open flow path between one of said first plurality of passages and one of said second plurality of passages.

17. The damper according to claim 1, wherein said tuning disc defines an always open flow path between said upper and lower working chambers.

* * * * *